Sept. 20, 1932.  R. STRIGEL  1,878,024
ELECTRIC GAS PURIFYING PLANT
Filed Aug. 5, 1929
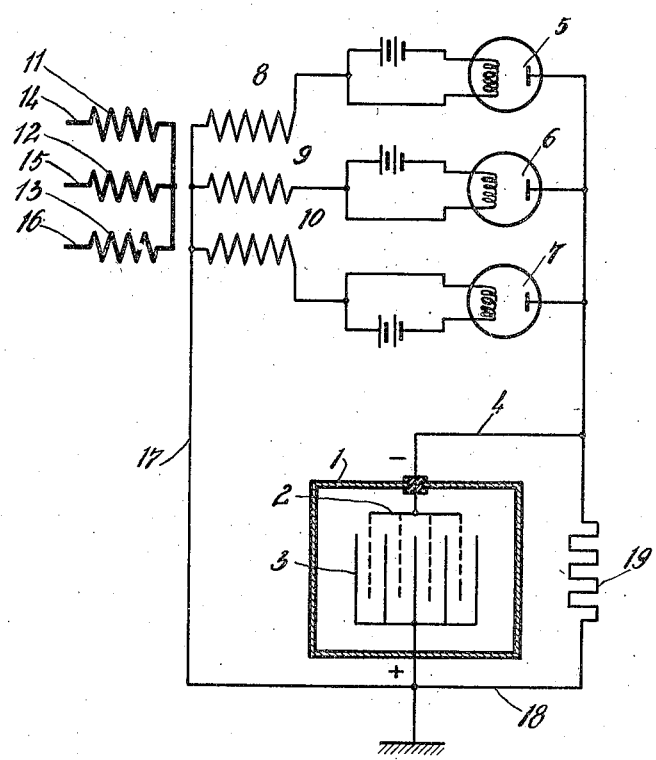

Patented Sept. 20, 1932

1,878,024

UNITED STATES PATENT OFFICE

ROBERT STRIGEL, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ELECTRIC GAS PURIFYING PLANT

Application filed August 5, 1929, Serial No. 383,741, and in Germany April 17, 1929.

My invention relates to improvements in electric gas purifying plants.

For feeding electric gas purifiers direct current produced by the rectification of high-tension alternating current is generally used. Current produced in this way is particularly useful for the resaon that it consists of direct current impulses following one another quickly at equal intervals and thus exerts a good ionization effect upon the gases. Since the purifying action of the plant depends substantially upon the electric field strength at the discharge wires, it is important to increase this field strength to the highest possible value obtainable in each individual case.

Such a pulsating direct current consists of very rapidly succeeding uniformly timed individual current impulses, which when occurring at the voltages desirable for very efficient gas purification purposes would have a voltage peak so high, that the voltage required for the corona discharge limit is by far exceeded. Theoretically, it is true, the voltage between succeeding impulses should drop to substantially zero. Careful investigations have shown, however, that the voltage and thus the electrostatic field intensity at the desirable comparatively high frequencies and voltages do not drop anywhere near to the zero point, but do not even drop below the corona discharge limit, and disruptive discharges cannot be avoided at the desirable frequencies. It has heretofore become necessary for this reason to employ comparatively low voltages when a desirable comparatively high frequency is employed.

According to my invention I employ means in such an arrangement by which even at comparatively high impulse frequencies and voltages the field strength between successive pulses drops below the corona discharge limit, in fact to a point near the zero line. I propose for this purpose to arrange in parallel to the filter electrodes a resistance of sufficiently great value, which permits the increase of the operating voltage or the impulse frequency, or both to a considerable extent without the danger of disruptive discharges occurring. Thus the efficiency of the purification plant can be increased by 10% or more.

My improvement not only applies to pulsating direct current produced from single phase alternating current, but includes also polyphase alternating current as a source.

In the drawing affixed to my specification an embodiment of my invention is illustrated by way of example.

In this drawing 1 is a treatment chamber in which are located the discharging electrodes 2 and the collecting electrodes 3. The discharge electrodes are connected to the anodes of the three electron tubes 5, 6 and 7 by the wire 4. The cathodes of the electron tubes are connected to the secondary windings 8, 9 and 10 of a high-tension transformer for three-phase current whose primary windings 11, 12 and 13 are connected to the supply by the wires 14, 15 and 16. The star connected ends of the secondary windings 8, 9 and 10 are connected to the grounded collecting electrodes 3 of the electric gas purifying chamber by the wire 17. In the wire 18 connected in parallel to the electrodes is connected a resistance 19 of such value that the field strength of the high-tension pulsating direct current passing between the electrodes 2 and 3 drops between successive pulses below the field valve at which corona effects occur.

It is, furthermore, of particular advantage to connect in parallel to the electric gas purifier a constant resistance, i. e. a resistance whose value is not affected by a varying voltage or by uncontrollable, ever varying conditions of the resistance medium or material itself. Suitable for this purpose are liquid resistances, wire resistances suitable for high-tension and wound on an insulator, or apparatus acting as constant resistance, such as electron tubes with hot cathodes operating above their current saturation and so on. In some cases a sufficient drop of the field strength at the discharging wires between any two charging current impulses may also be obtained by means of resistances dependent on the voltage. For this purpose there are, for instance, suitable silicium containing resistances or apparatus which represent a variable voltage resistance, such as electron tubes with hot cathodes operating below their current saturation, or electron tubes with cold cathodes which utilize the electron emission of cold metals under the action of high field strengths as the emission medium, all of which types of resistances are, however, definitely controllable, as compared for instance with open spark gaps, which break down in a haphazard way, depending upon the condition of the surrounding air prevailing at the particular instance.

It will be understood that so far as the present invention is concerned, it is immaterial whether the rectification is effected mechanically (by the well known mechanically rotated brushes) or electrically, for instance, by electron tubes.

I claim as my invention:

1. In an electric gas purifying plant, in combination, a gas treating chamber, discharging and collecting electrodes located in said chamber, a source of current for high-tension rectified alternating current, connecting lines between said source of current and said discharging and said collecting electrodes, and a shunt connection between said discharging and said collecting electrodes containing a constant resistance of sufficient value to lower the electric field strength at the electrodes to a point below the corona limit between successive charging current impulses.

2. In an electric gas purifying plant, in combination, a gas treating chamber, discharging and collecting electrodes located in said chamber, a source of current for high-tension rectified alternating current, connecting lines between said source of current and said discharging and said collecting electrodes, and a shunt connection between said discharging and said collecting electrodes containing a constant resistance, said resistance being adapted to lower the electric field strength at the electrodes to a point below the corona limit between successive charging current impulses.

3. In an electric gas purifying plant, in combination, a gas treating chamber, discharging and collecting electrodes located in said chamber, a connecting line between said discharging and said collecting electrodes containing a constant resistance adapted to lower the electric field strength at the electrodes below the corona limit; and a polyphase rectifier connected with said electrodes for supplying the operating current.

4. An improvement in the process of electric gas purification by means of high-tension rectified alternating current, which consists in employing rectified alternating current for feeding the electrodes in which between successive charging impulses the electric field strength drops below the corona limit.

In testimony whereof I affix my signature.

ROBERT STRIGEL.